United States Patent [19]

Sakamoto

[11] Patent Number: 5,050,973
[45] Date of Patent: Sep. 24, 1991

[54] SYMMETRICAL LENS SYSTEM FOR USE IN COPYING MACHINE

[75] Inventor: Keijiro Sakamoto, Kaloleni, Kenya

[73] Assignee: Minolta Camera Kabushiki Kaisha, Osaka, Japan

[21] Appl. No.: 465,925

[22] Filed: Jan. 16, 1990

[30] Foreign Application Priority Data

Jan. 18, 1989 [JP] Japan .................................. 1-10389

[51] Int. Cl.[5] .......................... G02B 3/02; G02B 9/36
[52] U.S. Cl. .................................. 359/708; 359/740; 359/775
[58] Field of Search ........................ 350/470, 450, 432

[56] References Cited

U.S. PATENT DOCUMENTS

| 3,370,904 | 2/1968 | Hudson. | |
|---|---|---|---|
| 3,449,040 | 6/1969 | Ruben. | |
| 3,507,560 | 4/1970 | Baker. | |
| 3,731,990 | 5/1973 | Van Orden. | |
| 4,561,730 | 12/1985 | Lawson et al. | 350/470 |

FOREIGN PATENT DOCUMENTS

59-45418 3/1984 Japan.
59-90811 5/1984 Japan.

Primary Examiner—Bruce Y. Arnold
Assistant Examiner—Rebecca D. Gass
Attorney, Agent, or Firm—Price, Gess & Ubell

[57] ABSTRACT

A symmetrical lens system comprising, as arranged from the object side toward the image side, a first lens in the form of a positive meniscus lens having its convex surface directed toward the object side, a second lens in the form of a negative meniscus lens having its convex surface directed toward the object side, a diaphragm, a third lens in the form of a negative meniscus lens symmetrical with the second lens with respect to the diaphragm, and a fourth lens in the form of a positive meniscus lens symmetrical with the first lens with respect to the diaphragm. At least, the concave surface of the first lens and the fourth lens is aspherical.

5 Claims, 7 Drawing Sheets

SYMMETRICAL LENS SYSTEM FOR USE IN COPYING MACHINE

BACKGROUND OF THE INVENTION

1. Field of the Invention

The present invention relates to compact lens systems for use in copying machines 2. Description of the Related Art To provide copying machines of reduced body size, it has been strongly desired in recent years to make the copying lens system also smaller-sized and wider in the angle of view. The lens systems heretofore known for use in copying machines include, for example, those of the Topogon type which are four-component lens systems with a wide angle of view as disclosed in Japanese Laid-Open Patent Applications No. 59-90811 and No. 59-45418. However, these lens systems are generally great in overall length, i.e., as great as at least 0.3 in the ratio of the overall length of lens system to the focal length, $\Sigma d/f$, and therefore they still remain to be improved in providing compactness.

The specifications of U.S. Pat. Nos. 3,370,904, 3,507,560 and 3,731,990 disclose wide-angle lens systems which are about 60 degrees in the angle of view $2\omega$ but are as great as 11 to 16 in f-number. The specification of U.S. Pat. No. 2,031,792 discloses a wide-angle lens system which has an angle of view $2\omega$ of 100 degrees and an f-number of 6.3 but which is great in overall length, i.e., 0.35 in the value of $\Sigma d/f$, and difficult to produce because of very small lens thicknesses.

The specification of U.S. Pat. No. 3,449,040 further discloses a lens system having an angle of view $2\omega$ of 66 degrees and an f-number of 5.6 but is 0.44 in the value of $\Sigma d/f$, hence a great overall length Such symmetrical lens systems can be of a wide angle of view but are usually limited to about 8 in fnumber and are relatively large-sized since the overall length is also limited to about 0.3 in term of $\Sigma d/f$.

SUMMARY OF THE INVENTION

Accordingly, the main object of the present invention is to provide a symmetrical lens system which is bright and compact although having a very wide angle of view.

Another object of the invention is to provide a bright compact wide-angle symmetrical lens system having aspherical lenses.

Another object of the invention is to provide a symmetrical lens system exhibiting satisfactory lens performance over the entire image surface.

These and other objects are attained by a a four-group four-lens symmetrical copying lens system comprising, as arranged from the object side toward the image side, a first lens in the form of a positive meniscus lens having its convex surface directed toward the object side, a second lens in the form of a negative meniscus lens having its convex surface directed toward the object side, a diaphragm, a third lens in the form of a negative meniscus lens symmetrical with the second lens with respect to the diaphragm, and a fourth lens in the form of a positive meniscus lens symmetrical with the first lens with respect to the diaphragm, at least the concave surfaces of the first lens and the fourth s being aspherical.

BRIEF DESCRIPTION OF THE DRAWINGS

These and other objects or features of the present invention will become apparent from the following description of preferred embodiments thereof taken in conjunction with the accompanying drawings, in which.

In the following description, like parts are designated by like reference numbers and symbols throughout the several drawings.

DESCRIPTION OF THE PREFERRED EMBODIMENTS

Embodiments of the present invention will be described below with reference to the drawings.

FIGS. 1, 3, 5 and 7 are sectional views showing the constructions of the lens systems of Embodiments 1, 2, 3 and 4, respectively.

These lens systems are four-lens symmetrical lens systems for use in copying machines which comprise, as arranged from the object side toward the image side, a first lens in the form of a positive meniscus lens having its convex surface directed toward the object side, a second lens in the form of a negative meniscus lens having its convex surface directed toward the object side, a diaphragm, a third lens in the form of a negative meniscus lens symmetrical with the third lens with respect to the diaphragm, and a fourth lens in the form of a positive meniscus lens symmetrical with the first lens with respect to the diaphragm. The concave surfaces of the first lens and the fourth lens are aspherical. These lens systems are 150 mm in focal length f Suppose the refractive index on d line of the material of the first and fourth lenses is N1, the refractive index on d line of the material of the second and third lenses is N2, the focal length of the entire lens system is f, the axial distance between the second lens and the third lens is d4+d5, the focal length of the first and fourth lenses is f1, and the focal length of the second and third lenses is f2.

The lens systems of Embodiments 1 to 4 then satisfy the following conditional inequaltities.

$$\tfrac{1}{2}(N1+N2) > 1.65 \qquad (1)$$

$$0.08f < d4+d5 < 0.15f \qquad (2)$$

$$-0.50f < f1+f2 < -0.25f \qquad (3)$$

The inequality (1) defines the condition for determining the kind of materials for making the first and fourth lenses and the second and third lenses. Unless this condition is satisfied, it is impossible to inhibit comatic flare errors, making it difficult to ensure a wider angle of view and larger aperture as contemplated by the present invention.

The inequaltiy (2) defines the axial distance between the second lens and the third lens. If the distance is smaller than the lower limit, increased astigmatism will result along with greater inclination of the image surface If the upper limit is exceeded aberrations are corrected advantageously, but the lens system will then become larger. Thus, the excessiYe distance is undesirable in providing a compacted system.

The unequality (3) represents the condition for determining the power of the first lens and the second lens, and the power of the third lens and the fourth lens. When the upper limit is exceeded, spherical aberration is corrected excessively, upsetting the oalance between the axial aberrations and the off-axis aberrations. If the sum is less than the lower limit, spherical aberration is corrected insufficiently, giving rise ro an increased amounr of asrigmatism.

In the case where lens systems similar to the above embodimenrs are to be composed of conventional spherical lenses only, with the aberrations diminished in good balance, the overall length of the lens system must invariably be about 0.3 in terms of $\Sigma d/f$. Attempts to decrease the overall length in one way or another resulr in increased spherical aberration and increased astigmatism, failing to afford satisfactory lens performance. Moreover, the lenses are smaller in thickness and difficult to manufacture.

The above problem can be overcome by using aspherical lenses. With the lens systems of the present invention, it has become possible to decrease the value of $\Sigma d/f$ to about 0.20 to about 0.25. Naturally, the lenses have such a thickness that they can be manufactured satisfactorily. The lens systems of the invention are also fully satisfactory in performance. Furthermore, the present lens systems are perfectly symmetrical, and therefore have two asymmetrical surfaces and exhibit correspondingly improved lens performance.

Tables 1, 2, 3 and 4 show the numerical values of the lenses constituting the systems of Embodiments 1, 2, 3 and 4, respectively, i.e., radii of curvature, axial distances, refractive indexes on d line of the lens materials and Abbe numbers. FIGS. 2, 4, 6 and 8 show aberration curves of Embodiments 1, 2, 3 and 4, respectively, as determined at a magnification of X1. These embodiments are 150 mm in focal length f, 7.0 in f-number and 26.5 degrees in half angle of view $\omega$.

The aspherical lens surface is identifiied as such by an asterisk attached to the radius curvature thereof. The aspherical coefficient Ai in the table is a coefficient of the function $x = f(y, z)$ representing the aspherical surface and obtained by plotting the optical axis as x-axis and plotting y-axis and z-axis of orthogonal coordinates in the plane of $x = 0$. When $y^2 + z^2 = \phi^2$, the function is expressed by the following equation:

$$x = \frac{\phi^2}{r\left(1 + \sqrt{1 - \frac{\phi^2}{r}}\right)} + \Sigma A i \phi^i$$

wherein r is a paraxial radius of curvature.

TABLE 1

| f = 150 Radius of curvature | | f-Number = 7.0 Axial distance | Refractive index (Nd) | Abbe number ($\nu$d) |
|---|---|---|---|---|
| r1 | 33.597 | | | |
| | | d1 6.19 | N1 1.65830 | $\nu$1 58.5 |
| r2* | 59.783 | | | |
| | | d2 0.30 | | |
| r3 | 27.457 | | | |
| | | d3 3.28 | N2 1.75520 | $\nu$2 27.5 |
| r4 | 21.098 | | | |
| | | d4 9.09 | | |
| S (diaphragm) | — | | | |
| | | d5 9.09 | | |
| r5 | −21.098 | | | |
| | | d6 3.28 | N3 1.75520 | $\nu$3 27.5 |
| r6 | −27.457 | | | |
| | | d7 0.30 | | |
| r7* | −59.783 | | | |
| | | d8 6.19 | N4 1.65830 | $\nu$4 58.5 |
| r8 | −33.597 | | | |
| | | $\Sigma$d = 37.73 | | |

Aspherical coefficient
r2: A2 = 0.0, A3 = 0.0, A4 = −0.55955 × $10^{-6}$, A5 = 0.0, A6 = −0.13018 × $10^{-8}$, A7 = 0.0, A8 = 0.50661 × $10^{-11}$, A9 = 0.0, A10 = −0.92296 × $10^{-14}$, A11 = 0.0, A12 = 0.23541 × $10^{-15}$, A13 = 0.0, A14 = −0.24566 × $10^{-17}$, A15 = 0.0, A16 = 0.55916 × $10^{-20}$
r7: A2 = 0.0, A3 = 0.0, A4 = 0.55955 × $10^{-6}$, A5 = 0.0, A6 = 0.13018 × $10^{-8}$, A7 = 0.0, A8 = −0.50661 × $10^{-11}$, A9 = 0.0, A10 = 0.92296 × $10^{-14}$, A11 = 0.0, A12 = −0.23541 × $10^{-15}$, A13 = 0.0, A14 = 0.24566 × $10^{-17}$, A15 = 0.0, A16 = −0.55916 × $10^{-20}$

TABLE 2

| f = 150 Radius of curvature | | f-Number = 7.0 Axial distance | Refractive index (Nd) | Abbe number (νd) |
|---|---|---|---|---|
| r1 | 34.212 | | | |
| | | d1 5.80 | N1 1.65830 | ν1 58.5 |
| r2* | 59.295 | | | |
| | | d2 0.30 | | |
| r3 | 26.175 | | | |
| | | d3 3.24 | N2 1.76182 | ν2 26.6 |
| r4 | 20.603 | | | |
| | | d4 8.31 | | |
| S (diaphragm) | — | | | |
| | | d5 8.31 | | |
| r5 | −20.603 | | | |
| | | d6 3.24 | N3 1.76182 | ν3 26.6 |
| r6 | −26.175 | | | |
| | | d7 0.30 | | |
| r7* | −59.295 | | | |
| | | d8 5.80 | N4 1.65830 | ν4 58.5 |
| r8 | −34.212 | | | |
| | | Σd = 35.30 | | |

Aspherical coefficient
r2: A2 = 0.0, A3 = 0.0, A4 = −0.75157 × $10^{-6}$, A5 = 0.0, A6 = −0.82159 × $10^{-9}$, A7 = 0.0, A8 = 0.47522 × $10^{-11}$, A9 = 0.0, A10 = −0.59646 × $10^{-13}$, A11 = 0.0, A12 = 0.37999 × $10^{-15}$, A13 = 0.0, A14 = −0.21847 × $10^{-17}$, A15 = 0.0, A16 = 0.47651 × $10^{-20}$
r7: A2 = 0.0, A3 = 0.0, A4 = 0.75157 × $10^{-6}$, A5 = 0.0, A6 = 0.82159 × $10^{-9}$, A7 = 0.0, A8 = −0.47522 × $10^{-11}$, A9 = 0.0, A10 = 0.59646 × $10^{-13}$, A11 = 0.0, A12 = −0.37999 × $10^{-15}$, A13 = 0.0, A14 = 0.21847 × $10^{-17}$, A15 = 0.0, A16 = −0.47651 × $10^{-20}$

TABLE 3

| f = 150 Radius of curvature | | f-Number = 7.0 Axial distance | Refractive index (Nd) | Abbe number (νd) |
|---|---|---|---|---|
| r1 | 34.279 | | | |
| | | d1 5.30 | N1 1.62135 | ν1 61.3 |
| r2* | 59.600 | | | |
| | | d2 0.50 | | |
| r3 | 24.283 | | | |
| | | d3 3.22 | N2 1.75000 | ν2 25.1 |
| r4 | 19.571 | | | |
| | | d4 7.52 | | |
| S (diaphragm) | — | | | |
| | | d5 7.52 | | |
| r5 | −19.571 | | | |
| | | d6 3.22 | N3 1.75000 | ν3 25.1 |
| r6 | −24.283 | | | |
| | | d7 0.50 | | |
| r7* | −34.279 | | | |
| | | d8 5.30 | N4 1.62135 | ν4 61.3 |
| r8 | −34.279 | | | |
| | | Σd = 33.08 | | |

Aspherical coefficient
r2: A2 = 0.0, A3 = 0.0, A4 = −0.10265 × $10^{-15}$, A5 = 0.0, A6 = −0.14379 × $10^{-8}$, A7 = 0.0, A8 = 0.82335 × $10^{-11}$, A9 = 0.0, A10 = −0.70510 × $10^{-13}$, A11 = 0.0, A12 = 0.25103 × $10^{-15}$, A13 = 0.0, A14 = −0.20137 × $10^{-17}$, A15 = 0.0, A16 = 0.58398 × $10^{-20}$
r7: A2 = 0.0, A3 = 0.0, A4 = 0.10265 × $10^{-5}$, A5 = 0.0, A6 = 0.14379 × $10^{-8}$, A7 = 0.0, A8 = −0.82335 × $10^{-11}$, A9 = 0.0, A10 = 0.70510 × $10^{-13}$, A11 = 0.0, A12 = −0.25103 × $10^{-15}$, A13 = 0.0, A14 = 0.20137 × $10^{-17}$, A15 = 0.0, A16 = −0.58398 × $10^{-20}$

TABLE 4

| f = 150 Radius of curvature | | f-Number = 7.0 Axial distance | Refractive index (Nd) | Abbe number (νd) |
|---|---|---|---|---|
| r1 | 34.379 | | | |
| | | d1 5.00 | N1 1.62135 | ν1 61.3 |
| r2* | 59.840 | | | |
| | | d2 0.50 | | |
| r3 | 24.069 | | | |
| | | d3 3.21 | N2 1.75000 | ν2 25.1 |
| r4 | 19.440 | | | |
| | | d4 7.02 | | |
| S (diaphragm) | — | | | |
| | | d5 7.02 | | |
| r5 | −19.440 | | | |
| | | d6 3.21 | N3 1.75000 | ν3 25.1 |
| r6 | −24.069 | | | |
| | | d7 0.50 | | |
| r7* | −59.840 | | | |
| | | d8 5.00 | N4 1.62135 | ν4 61.3 |
| r8 | −34.379 | | | |

TABLE 4-continued

| f = 150 Radius of curvature | f-Number = 7.0 Axial distance | Refractive index (Nd) | Abbe number (νd) |
|---|---|---|---|
| | $\Sigma d = 31.46$ | | |

Figure 1:
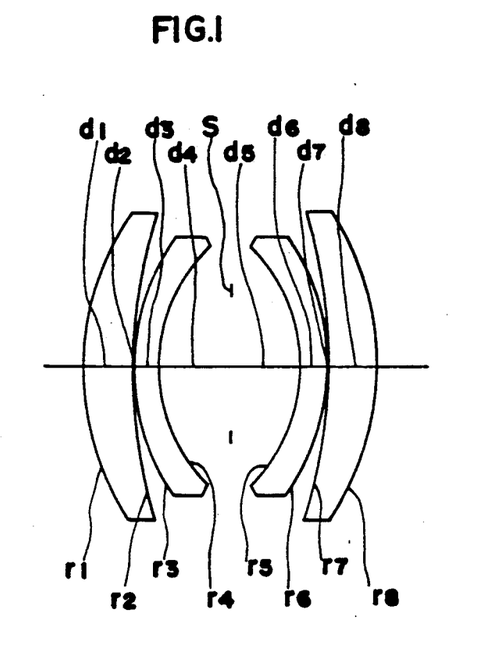
FIG. 1 is a sectional view showing the construction of a lens system as Embodiment 1 of the invention.
Figure 2:
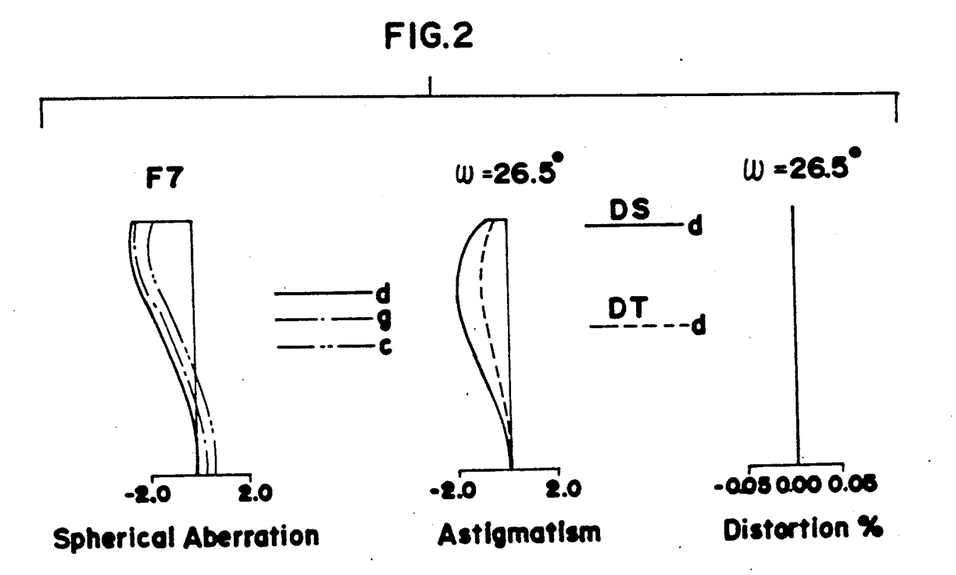
FIG. 2 shows aberration curves of the lens system of FIG. 1.
Figure 3:
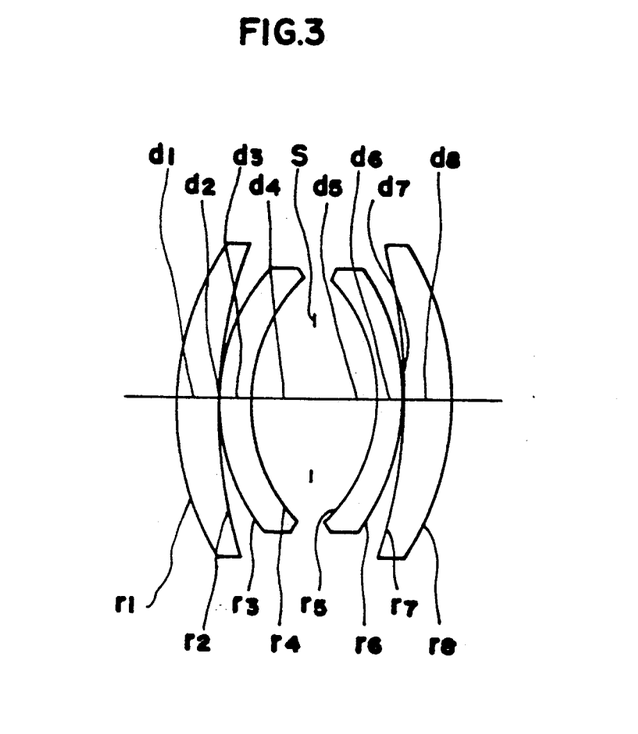
FIG. 3 is a sectional view showing the construction of another lens system as Embodiment 2 of the invention.
Figure 4:
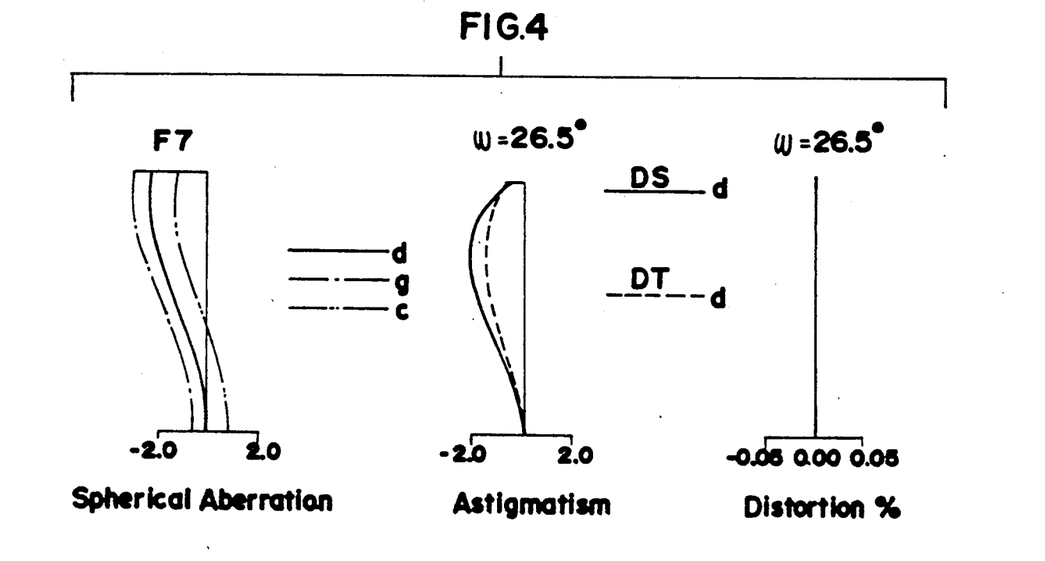
FIG. 4 shows aberration curves of the lens system of FIG. 3.
Figure 5:
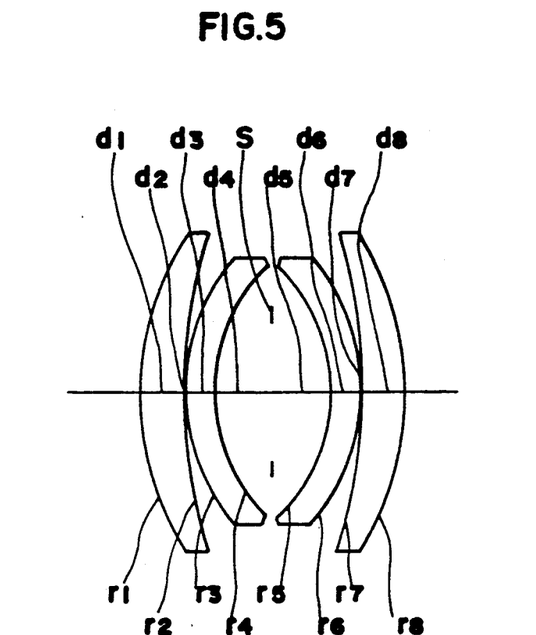
FIG. 5 is a sectional view showing the construction of another lens system, i.e., Embodiment 3 of the invention.
Figure 6:
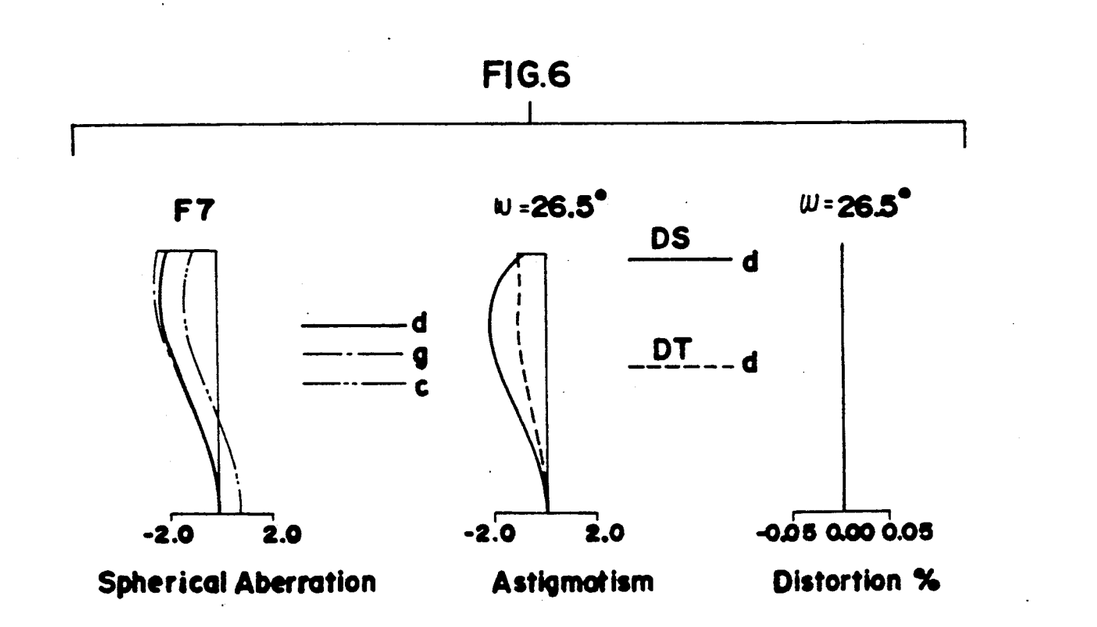
FIG. 6 shows aberration curves of the lens system of FIG. 5.
Figure 7:
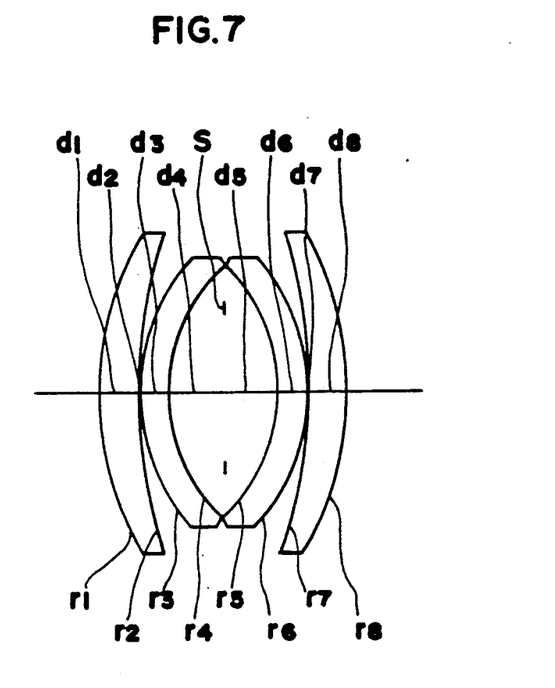
FIG. 7 is a sectional view showing the construction of another lens system, i.e., Embodiment 4 of the invention.
Figure 8:
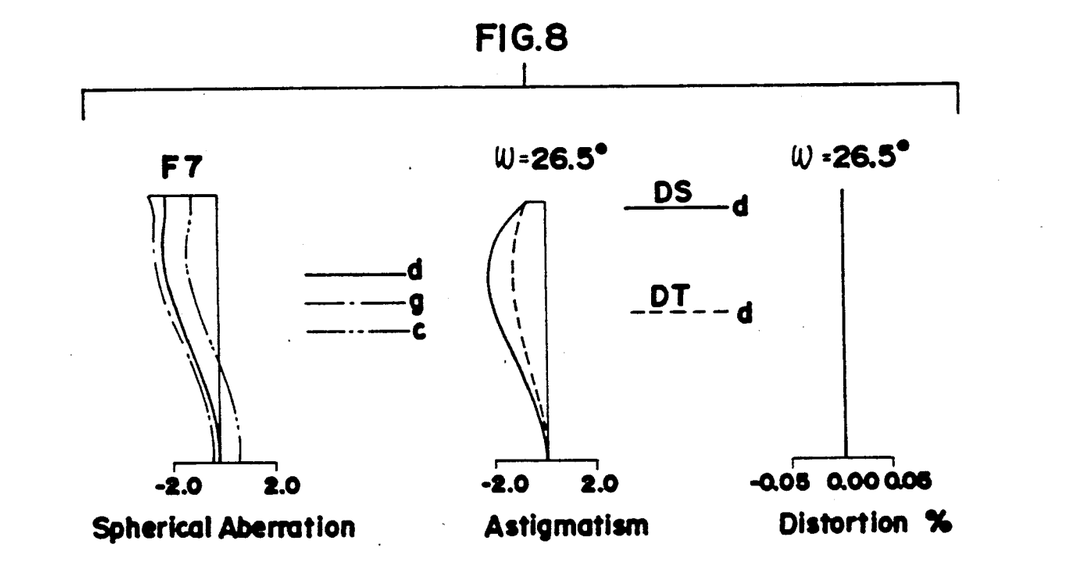
FIG. 8 shows aberration curves of the lens system of FIG. 7.
Figure 9:
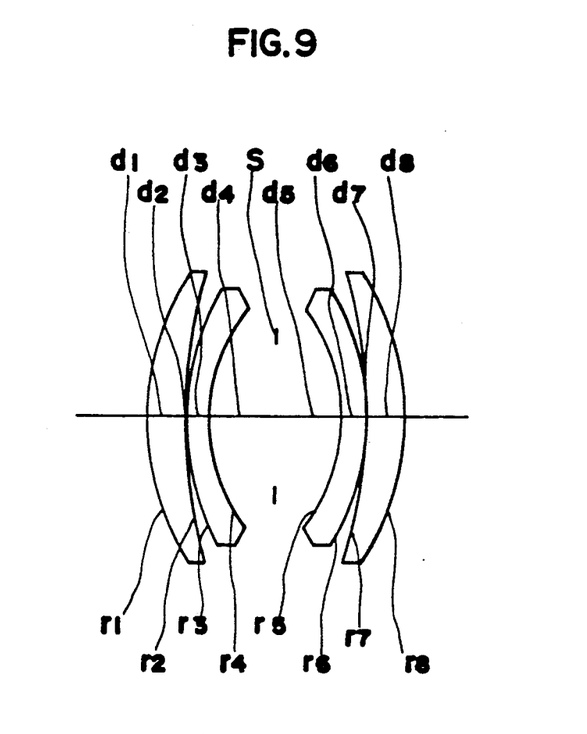
FIG. 9 is a sectional view showing the construction of another lens system, i.e., Embodiment 5 of the invention.
Figure 10:
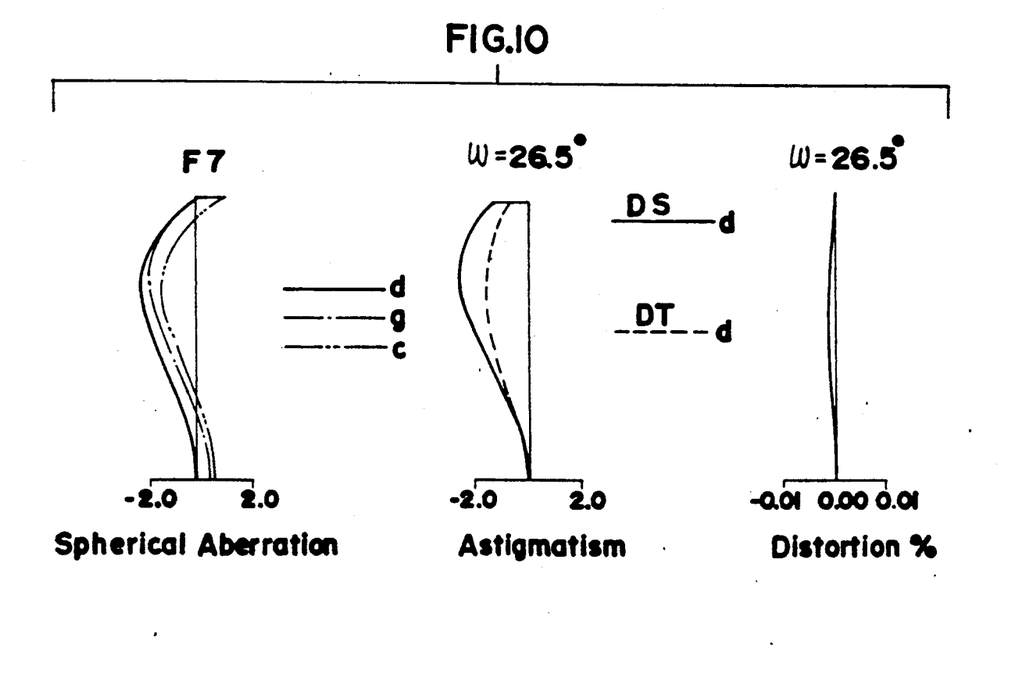
FIG. 10 shows aberration curves of the lens system of FIG. 9.
Figure 11:
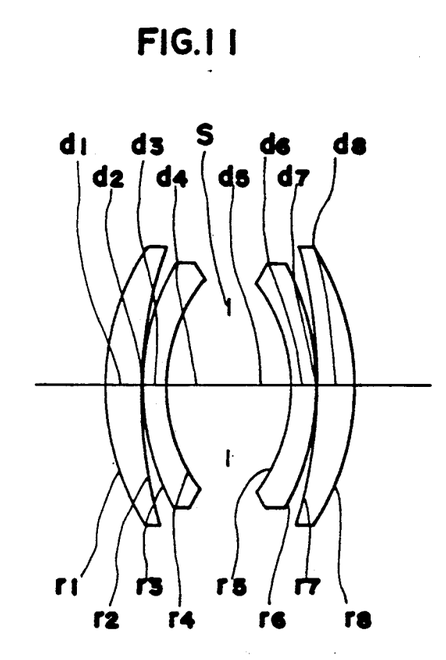
FIG. 11 is a sectional view showing the construction of another lens system, i.e., Embodiment 6 of the invention.
Figure 12:
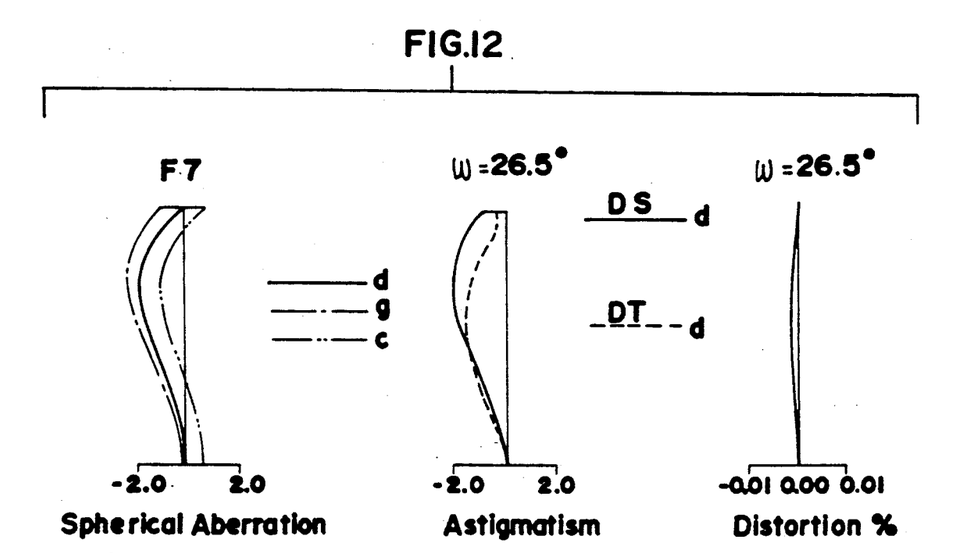
FIG. 12 shows aberration curves of the lens system of FIG. 11.
Figure 13:
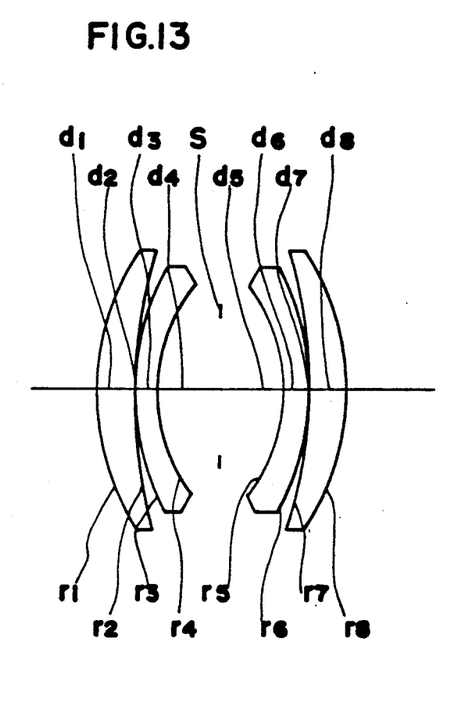
FIG. 13 is a sectional view showing the construction of another lens system, i.e., Embodiment 7 of the invention.
Figure 14:
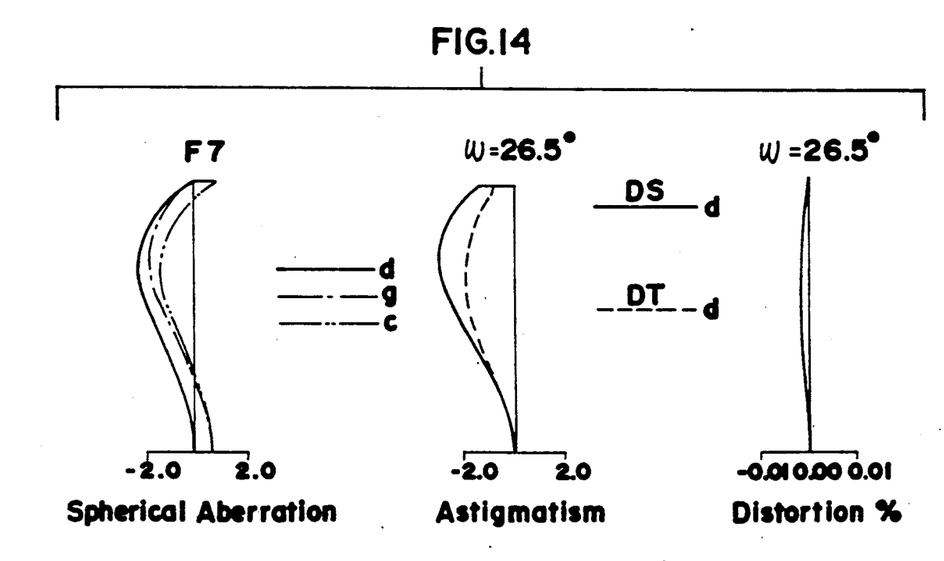
FIG. 14 shows aberration curves of the lens system of FIG. 13.

Aspherical coefficient
r2: $A2 = 0.0, A3 = 0.0, A4 = -0.10882 \times 10^{-5}, A5 = 0.0, A6 = -0.17306 \times 10^{-8}, A7 = 0.0, A8 = 0.10433 \times 10^{-10}, A9 = 0.0, A10 = -0.63915 \times 10^{-13}, A11 = 0.0, A12 = 0.66294 \times 10^{-16}, A13 = 0.0, A14 = -0.19931 \times 10^{-17}, A15 = 0.0, A16 = 0.77430 \times 10^{-20}$
r7: $A2 = 0.0, A3 = 0.0, A4 = 0.10882 \times 10^{-5}, A5 = 0.0, A6 = 0.17306 \times 10^{-8}, A7 = 0.0, A8 = -0.10433 \times 10^{-10}, A9 = 0.0, A10 = 0.63915 \times 10^{-13}, A11 = 0.0, A12 = -0.66294 \times 10^{-16}, A13 = 0.0, A14 = 0.19931 \times 10^{-17}, A15 = 0.0, A16 = -0.77430 \times 10^{-20}$ Next, Embodiments 5 to 7 will be described which are lens systems each comprising four lenses the surfaces of which are aspherical. FIGS. 9, 11 and 13 show the constructions of Embodiments 5, 6 and 7, respectively. More specifically, these four-lens systems comprise, as arranged from the left object side toward the image side, a first lens in the form of a positive meniscus lens having its convex surface directed toward the object side, a second lens in the form of a negative meniscus lens having its convex surface directed toward the object side, a diaphragm, a third lens in the form of a negative meniscus lens symmetrical with the third lens with respect to the diaphragm, and a fourth lens in the form of a positive meniscus lens symmetrical with the first lens with respect to the diaphragm.

Suppose the refractive index on d line of the material of the first and fourth lenses is N1, the refractive index on d line of the material of the second and third lenses is N2, the focal length of the entire lens system is f, the axial distance between the second lens and the diaphragm is d4, the axial distance between the diaphragm and the third lens is d5, the axial distance between the second lens and the third lens is therefore d4+d5, the focal length of the first lens is f1, and the focal length of the second lens is f2 The above lens systems then satisfy the following conditional inequalties.

$$\tfrac{1}{2}(N1+N2) > 1.65 \quad (4)$$

$$0.06f < d4+d5 < 0.15f \quad (5)$$

$$<0.20f < f1+f2 < -0.10f \quad (6)$$

The inequality (4) defines the condition for determining the lens materials to be used. Unless this condition is satisfied, it is impossible to fully diminish comatic flare errors, making it difficult to ensure a wider angle of view.

The inequality (5) determines the axial distance between the second lens and the third lens. If this distance is smaller than the lower limit, increased astigmatism will result along with marked inclination of the image surface. Distances exceeding the upper limit are advantageous to the correction of aberrations, and especially facilitate the correction of astigmatism, but are undesirable in providing compacted systems since the lens system will then become larger.

The inequality (6) represents the condition for determining the sum of powers of the first lens and the second lens and the sum of powers of the third lens and the fourth lens. When the upper limit is exceeded, spherical aberration is corrected excessively, upsetting the balance between the image surface on the axis and the off-axis image surface. If the sum of the focal lengths is less than the lower limit, increased astigmatism will result.

As another feature of the present invention, aspherical lens surfaces are used for the above embodiments. In the case where lens systems are to be composed of lenses having spherical surfaces only as practiced conventionally, with the aberrations diminished in good balance, the overall length of the system must inevitably be greater than about 0.3 in terms of $\Sigma d/f$. Attempts to decrease the overall length in one way or another entail increased spherical aberration and increased astigmatism, failing to give satisfactory lens performance. Moreover, the lenses then become smaller in thickness and difficult to manufacture.

Nevertheless, the use of aspherical surfaces provides lens systems which are greatly reduced in overall length and are as small as 0.15 to 0.25 in terms of $\Sigma d/f$. Naturally, the component lenses have such a thickness that they can be manufactured fully satisfactorily to afford a lens system which is also very satisfactory in performace.

Tables 5, 7 and 9 show the numerical values of the lenses used for Embodiments 5, 6 and 7, respectively, i.e., radii of curvature, axial distances, refractive indexes on d line of the lens materials and Abbe numbers. Tables 6, 8 and 10 show the aspherical coefficients of Embodiments 5, 6 and 7, respectively.

Table 11 collectively shows the numerical values, satisfying the inequalities (1) to (6), of Embodiments 1 to 7.

TABLE 5

| f = 150 Radius of curvature | f-Number = 7.0 | | Abbe Number (νd) |
|---|---|---|---|
| | Axial distance | Refractive index (Nd) | |
| r1* | 29.451 | | |
| | d1 5.55 | N1 1.67100 | ν1 51.7 |
| r2* | 63.617 | | |
| | d2 0.20 | | |
| r3* | 32.995 | | |
| | d3 3.34 | N2 1.75690 | ν2 31.8 |
| r4* | 21.544 | | |
| | d4 9.83 | | |
| S (diaphragm) | — | | |
| | d5 9.83 | | |
| r5* | −21.544 | | |
| | d6 3.34 | N3 1.75690 | ν3 31.8 |
| r6* | −32.995 | | |
| | d7 0.20 | | |
| r7* | −63.617 | | |
| | d8 5.55 | N4 1.67100 | ν3 51.7 |
| r8* | −29.451 | | |
| | $\Sigma d = 37.84$ | | |

TABLE 6

| Aspherical coefficient | | | | | |
|---|---|---|---|---|---|
| r1: A2 = 0.0, | A3 = 0.0, | A4 = −0.16257 × 10⁻⁶, | A5 = 0.0, | A6 = −0.15118 × 10⁻⁸ |
| A7 = 0.0, | A8 = 0.21220 × 10⁻¹⁰, | A9 = 0.0, | A10 = −0.16484 × 10⁻¹², | A11 = 0.0 |

TABLE 6-continued

Aspherical coefficient

|  | A12 = 0.93704 × 10$^{-15}$, | A13 = 0.0, | A14 = −0.22208 × 10$^{-17}$, | A15 = 0.0, | A16 = 0.0 |
|---|---|---|---|---|---|
| r2: | A2 = 0.0, | A3 = 0.0, | A4 = −0.11406 × 10$^{-6}$ | A5 = 0.0, | A6 = −0.10104 × 10$^{-9}$ |
|  | A7 = 0.0, | A8 = 0.86071 × 10$^{-11}$, | A9 = 0.0, | A10 = 0.34449 × 10$^{-13}$, | A11 = 0.0 |
|  | A12 = −0.41464 × 10$^{-15}$, | A13 = 0.0, | A14 = 0.0, | A15 = 0.0, | A16 = 0.0 |
| r3: | A2 = 0.0, | A3 = 0.0, | A4 = 0.17219 × 10$^{-6}$, | A5 = 0.0, | A6 = −0.53688 × 10$^{-9}$ |
|  | A7 = 0.0, | A8 = −0.30520 × 10$^{-11}$, | A9 = 0.0, | A10 = 0.40110 × 10$^{-13}$, | A11 = 0.0 |
|  | A12 = 0.0, | A13 = 0.0, | A14 = 0.0, | A15 = 0.0, | A16 = 0.0 |
| r4: | A2 = 0.0, | A3 = 0.0, | A4 = −0.29519 × 10$^{-7}$, | A5 = 0.0, | A6 = −0.27062 × 10$^{-9}$ |
|  | A7 = 0.0, | A8 = 0.21110 × 10$^{-11}$, | A9 = 0.0, | A10 = 0.70551 × 10$^{-13}$, | A11 = 0.0 |
|  | A12 = 0.19574 × 10$^{-15}$, | A13 = 0.0, | A14 = 0.0, | A15 = 0.0, | A16 = 0.0 |
| r5: | A2 = 0.0, | A3 = 0.0, | A4 = 0.29519 × 10$^{-7}$, | A5 = 0.0, | A6 = 0.27062 × 10$^{-9}$ |
|  | A7 = 0.0, | A8 = −0.21110 × 10$^{-11}$, | A9 = 0.0, | A10 = −0.70551 × 10$^{-13}$, | A11 = 0.0 |
|  | A12 = −0.19574 × 10$^{-15}$, | A13 = 0.0, | A14 = 0.0, | A15 = 0.0, | A16 = 0.0 |
| r6: | A2 = 0.0, | A3 = 0.0, | A4 = −0.17219 × 10$^{-6}$, | A5 = 0.0, | A6 = 0.53688 × 10$^{-9}$ |
|  | A7 = 0.0, | A8 = 0.30520 × 10$^{-11}$, | A9 = 0.0, | A10 = −0.40110 × 10$^{-13}$, | A11 = 0.0 |
|  | A12 = 0.0, | A13 = 0.0, | A14 = 0.0, | A15 = 0.0, | A16 = 0.0 |
| r7: | A2 = 0.0, | A3 = 0.0, | A4 = 0.11406 × 10$^{-6}$, | A5 = 0.0, | A6 = 0.10104 × 10$^{-9}$ |
|  | A7 = 0.0, | A8 = −0.86071 × 10$^{-11}$, | A9 = 0.0, | A10 = −0.34449 × 10$^{-13}$, | A11 = 0.0 |
|  | A12 = 0.41464 × 10$^{-15}$, | A13 = 0.0, | A14 = 0.0, | A15 = 0.0, | A16 = 0.0 |
| r8: | A2 = 0.0, | A3 = 0.0, | A4 = 0.16257 × 10$^{-6}$, | A5 = 0.0, | A6 = 0.15118 × 10$^{-8}$ |
|  | A7 = 0.0, | A8 = −0.21220 × 10$^{-10}$, | A9 = 0.0, | A10 = 0.16484 × 10$^{-12}$, | A11 = 0.0 |
|  | A12 = −0.93704 × 10$^{-15}$, | A13 = 0.0, | A14 = 0.22208 × 10$^{-17}$, | A15 = 0.0, | A16 = 0.0 |

TABLE 7 f = 150, f-Number = 7.0

| Radius of curvature | Axial distance | Refractive index (Nd) | Abbe Number (νd) |
|---|---|---|---|
| r1* 29.451 |  |  |  |
|  | d1 4.65 | N1 1.69350 | ν1 50.3 |
| r2* 55.967 |  |  |  |
|  | d2 0.15 |  |  |
| r3* 30.302 |  |  |  |
|  | d3 2.87 | N2 1.75690 | ν2 29.7 |
| r4* 21.162 |  |  |  |
|  | d4 8.07 |  |  |
| S (diaphragm) — |  |  |  |
| r5* −21.162 |  |  |  |
|  | d5 8.07 |  |  |
| r6* −30.302 |  |  |  |
|  | d6 2.87 | N3 1.75690 | ν3 29.7 |
| r7* −55.967 |  |  |  |
|  | d7 0.15 |  |  |
| r8* −29.451 |  |  |  |
|  | d8 4.65 | N4 1.69350 | ν3 50.3 |
|  | Σd = 31.48 |  |  |

TABLE 8

Aspherical coefficient

| r1: | A2 = 0.0, | A3 = 0.0, | A4 = −0.11037 × 10$^{-6}$, | A5 = 0.0, | A6 = −0.60344 × 10$^{-9}$ |
|---|---|---|---|---|---|
|  | A7 = 0.0, | A8 = 0.25438 × 10$^{-10}$, | A9 = 0.0, | A10 = −0.19565 × 10$^{-12}$, | A11 = 0.0 |
|  | A12 = 0.93704 × 10$^{-15}$, | A13 = 0.0, | A14 = −0.22208 × 10$^{-17}$, | A15 = 0.0, | A16 = 0.0 |
| r2: | A2 = 0.0, | A3 = 0.0, | A4 = −0.18057 × 10$^{-6}$, | A5 = 0.0, | A6 = −0.82853 × 10$^{-10}$ |
|  | A7 = 0.0, | A8 = 0.89313 × 10$^{-11}$, | A9 = 0.0, | A10 = −0.56667 × 10$^{-13}$, | A11 = 0.0 |
|  | A12 = −0.17540 × 10$^{-15}$, | A13 = 0.0, | A14 = 0.0, | A15 = 0.0, | A16 = 0.0 |
| r3: | A2 = 0.0, | A3 = 0.0, | A4 = 0.22791 × 10$^{-6}$, | A5 = 0.0, | A6 = −0.64818 × 10$^{-9}$ |
|  | A7 = 0.0, | A8 = −0.48769 × 10$^{-11}$, | A9 = 0.0, | A10 = 0.68502 × 10$^{-13}$, | A11 = 0.0 |
|  | A12 = 0.0, | A13 = 0.0, | A14 = 0.0, | A15 = 0.0, | A16 = 0.0 |
| r4: | A2 = 0.0, | A3 = 0.0, | A4 = −0.69318 × 10$^{-7}$, | A5 = 0.0, | A6 = 0.25718 × 10$^{-9}$ |
|  | A7 = 0.0, | A8 = 0.82041 × 10$^{-11}$, | A9 = 0.0, | A10 = 0.10183 × 10$^{-12}$, | A11 = 0.0 |
|  | A12 = 0.63585 × 10$^{-15}$, | A13 = 0.0, | A14 = 0.0, | A15 = 0.0, | A16 = 0.0 |
| r5: | A2 = 0.0, | A3 = 0.0, | A4 = 0.69318 × 10$^{-7}$, | A5 = 0.0, | A6 = −0.25718 × 10$^{-9}$ |
|  | A7 = 0.0, | A8 = −0.82041 × 10$^{-11}$, | A9 = 0.0, | A10 = −0.10183 × 10$^{-12}$, | A11 = 0.0 |
|  | A12 = −0.63585 × 10$^{-15}$, | A13 = 0.0, | A14 = 0.0, | A15 = 0.0, | A16 = 0.0 |
| r6: | A2 = 0.0, | A3 = 0.0, | A4 = −0.22791 × 10$^{-6}$, | A5 = 0.0, | A6 = 0.64818 × 10$^{-9}$ |
|  | A7 = 0.0, | A8 = 0.48769 × 10$^{-11}$, | A9 = 0.0, | A10 = −0.68502 × 10$^{-13}$, | A11 = 0.0 |
|  | A12 = 0.0, | A13 = 0.0, | A14 = 0.0, | A15 = 0.0, | A16 = 0.0 |
| r7: | A2 = 0.0, | A3 = 0.0, | A4 = 0.18057 × 10$^{-6}$, | A5 = 0.0, | A6 = 0.82853 × 10$^{-10}$ |
|  | A7 = 0.0, | A8 = −0.89313 × 10$^{-11}$, | A9 = 0.0, | A10 = 0.56667 × 10$^{-13}$, | A11 = 0.0 |

TABLE 8-continued

Aspherical coefficient

| | | | | |
|---|---|---|---|---|
| $A12 = 0.17540 \times 10^{-15}$, | $A13 = 0.0$, | $A14 = 0.0$, | $A15 = 0.0$, | $A16 = 0.0$ |
| r8: $A2 = 0.0$, | $A3 = 0.0$, | $A4 = 0.11037 \times 10^{-6}$, | $A5 = 0.0$, | $A6 = 0.60344 \times 10^{-9}$ |
| $A7 = 0.0$, | $A8 = -0.25438 \times 10^{-10}$, | $A9 = 0.0$, | $A10 = 0.19565 \times 10^{-12}$, | $A11 = 0.0$ |
| $A12 = -0.93704 \times 10^{-15}$, | $A13 = 0.0$, | $A14 = 0.22208 \times 10^{-17}$, | $A15 = 0.0$, | $A16 = 0.0$ |

TABLE 9

$f = 150$, f-Number = 7.0

| Radius of curvature | | Axial distance | Refractive index (Nd) | Abbe Number ($\nu d$) |
|---|---|---|---|---|
| r1* | 31.381 | | | |
| | | d1 4.22 | N1 1.69350 | $\nu$1 51.8 |
| r2* | 60.360 | | | |
| | | d2 0.15 | | |
| r3* | 31.071 | | | |
| | | d3 3.21 | N2 1.75690 | $\nu$2 29.7 |
| r4* | 21.975 | | | |
| | | d4 5.99 | | |
| S (diaphragm) | — | | | |
| | | d5 5.99 | | |
| r5* | −21.975 | | | |
| | | d6 3.21 | N3 1.75690 | $\nu$3 29.7 |
| r6* | −31.071 | | | |
| | | d7 0.15 | | |
| r7* | −60.360 | | | |
| | | d8 4.22 | N4 1.69350 | $\nu$3 51.8 |
| r8* | −31.381 | | | |
| | | $\Sigma d = 27.15$ | | |

TABLE 10

Aspherical coefficient

| | | | | |
|---|---|---|---|---|
| r1: $A2 = 0.0$, | $A3 = 0.0$, | $A4 = -0.87454 \times 10^{-7}$, | $A5 = 0.0$, | $A6 = 0.17016 \times 10^{-9}$ |
| $A7 = 0.0$, | $A8 = 0.27351 \times 10^{-10}$, | $A9 = 0.0$, | $A10 = -0.16079 \times 10^{-12}$, | $A11 = 0.0$, |
| $A12 = 0.93704 \times 10^{-15}$, | $A13 = 0.0$, | $A14 = 0.22208 \times 10^{-17}$, | $A15 = 0.0$, | $A16 = 0.0$ |
| r2: $A2 = 0.0$, | $A3 = 0.0$, | $A4 = -0.21518 \times 10^{-6}$, | $A5 = 0.0$, | $A6 = -0.12514 \times 10^{-9}$ |
| $A7 = 0.0$, | $A8 = 0.11352 \times 10^{-10}$, | $A9 = 0.0$, | $A10 = -0.56121 \times 10^{-13}$, | $A11 = 0.0$ |
| $A12 = -0.67068 \times 10^{-16}$, | $A13 = 0.0$, | $A14 = 0.0$, | $A15 = 0.0$, | $A16 = 0.0$ |
| r3: $A2 = 0.0$, | $A3 = 0.0$, | $A4 = 0.25249 \times 10^{-6}$, | $A5 = 0.0$, | $A6 = -0.70953 \times 10^{-9}$ |
| $A7 = 0.0$, | $A8 = -0.84330 \times 10^{-11}$, | $A9 = 0.0$, | $A10 = 0.75238 \times 10^{-13}$, | $A11 = 0.0$ |
| $A12 = 0.0$, | $A13 = 0.0$, | $A14 = 0.0$, | $A15 = 0.0$, | $A16 = 0.0$ |
| r4: $A2 = 0.0$, | $A3 = 0.0$, | $A4 = -0.88133 \times 10^{-7}$, | $A5 = 0.0$, | $A6 = 0.53568 \times 10^{-9}$ |
| $A7 = 0.0$, | $A8 = 0.13181 \times 10^{-10}$, | $A9 = 0.0$, | $A10 = 0.13875 \times 10^{-12}$, | $A11 = 0.0$ |
| $A12 = 0.74276 \times 10^{-15}$, | $A13 = 0.0$, | $A14 = 0.0$, | $A15 = 0.0$, | $A16 = 0.0$ |
| r5: $A2 = 0.0$, | $A3 = 0.0$, | $A4 = 0.88133 \times 10^{-7}$, | $A5 = 0.0$, | $A6 = -0.53568 \times 10^{-9}$ |
| $A7 = 0.0$, | $A8 = -0.13181 \times 10^{-10}$, | $A9 = 0.0$, | $A10 = -0.13875 \times 10^{-12}$, | $A11 = 0.0$ |
| $A12 = -0.74276 \times 10^{-15}$, | $A13 = 0.0$, | $A14 = 0.0$, | $A15 = 0.0$, | $A16 = -0.0$ |
| r6: $A2 = 0.0$, | $A3 = 0.0$, | $A4 = -0.25249 \times 10^{-6}$, | $A5 = 0.0$, | $A6 = 0.70953 \times 10^{-9}$ |
| $A7 = 0.0$, | $A8 = 0.84003 \times 10^{-11}$, | $A9 = 0.0$, | $A10 = -0.75238 \times 10^{-13}$, | $A11 = 0.0$, |
| $A12 = 0.0$, | $A13 = 0.0$, | $A14 = 0.0$, | $A15 = 0.0$, | $A16 = 0.0$ |
| r7: $A2 = 0.0$, | $A3 = 0.0$, | $A4 = 0.21518 \times 10^{-6}$, | $A5 = 0.0$, | $A6 = 0.12514 \times 10^{-9}$ |
| $A7 = 0.0$, | $A8 = -0.11352 \times 10^{-10}$, | $A9 = 0.0$, | $A10 = 0.56121 \times 10^{-13}$, | $A11 = 0.0$ |
| $A12 = 0.67068 \times 10^{-16}$, | $A13 = 0.0$, | $A14 = 0.0$, | $A15 = 0.0$, | $A16 = 0.0$ |
| r8: $A2 = 0.0$, | $A3 = 0.0$, | $A4 = 0.87454 \times 10^{-7}$, | $A5 = 0.0$, | $A6 = -0.17016 \times 10^{-9}$ |
| $A7 = 0.0$, | $A8 = -0.27351 \times 10^{-10}$, | $A9 = 0.0$, | $A10 = 0.16079 \times 10^{-12}$, | $A11 = 0.0$, |
| $A12 = -0.93704 \times 10^{-15}$, | $A13 = 0.0$, | $A14 = 0.22208 \times 10^{-17}$, | $A15 = 0.0$, | $A16 = 0.0$ |

TABLE 11

| Claimed inequality | (1) $\frac{1}{2}(N1 + N2) > 1.65$ | (2) $0.08f < d4 + d5 < 0.15f$ | (3) $-0.50f < f1 + f2 < -0.25f$ |
|---|---|---|---|
| Values of Embodiment | | | |
| Embodiment 1 | $\frac{1}{2}(N1 + N2) = 1.70675$ | $d4 + d5 = 0.1212f$ | $f1 + f2 = -0.323f$ |
| Embodiment 2 | 1.71006 | 0.1108f | −0.382f |
| Embodiment 3 | 1.68568 | 0.1003f | −0.466f |
| Embodiment 4 | 1.68568 | 0.0936f | −0.472f |
| Claimed inequality | (4) $\frac{1}{2}(N1 + N2) > 1.65$ | (5) $0.06f < d4 + d5 < 0.15f$ | (6) $-0.20f < f1 + f2 < -0.10f$ |
| Values of Embodiment | | | |
| Embodiment 5 | 1.7395 | 0.131f | −0.115f |

TABLE 11-continued

| | | | |
|---|---|---|---|
| Embodiment 6 | 1.7252 | 0.108f | −0.157f |
| Embodiment 7 | 1.7252 | 0.0799f | −0.187f |

As described above, the symmetrical copying lens system of the present invention is a four-component wide-angle lens system which nevertheless has a shortened overall length, is compact and therefore gives a reduced body size to copying machines. The present lens system is 7.0 in f-number, which indicates that the system affords brighter images and is more advantageous in respect of the quantity of light available than conventional wide-angle lens systems. Although lens systems can be made as wide as the system of the invention in the angle of view when composed of six or more lenses, the use of the increased number of lenses is disadvantageous to the provison of compacted systems of reduced cost. The present invention has a great advantage also in this respect.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A symmetrical lens system comprising, as arranged from the object side toward the image side,
    a first lens element in the form of a positive meniscus lens having its convex surface directed toward the object side,
    a second lens element in the form of a negative meniscus lens having its convex surface directed toward the object side,
    a diaphragm,
    a third lens element in the form of a negative meniscus lens symmetrical with the second lens with respect to the diaphragm,
    a fourth lens element in the form of a positive meniscus lens symmetrical with the first lens with respect to the diaphragm, and
    at least the concave surface of the first lens element and the fourth lens element being constructed to be aspherical in such a manner that the compactness of the lens system is obtained while maintaining a wide angle and a small F number, wherein the lens system fulfills the following conditions:

$\Sigma d/f < 0.3$ $\Sigma d$: the overall length of the entire lens system
    f: the focal length of the entire lens system.

2. A symmetrical lens system comprising, as arranged from the object side toward the image side:
    a first lens element in the form of a positive meniscus lens having its convex surface directed toward the object side and its concave surface being aspherical;
    a second lens element in the form of a negative meniscus lens having its convex surface directed toward the object side;
    a diaphragm;
    a third lens element in the form of a negative meniscus lens symmetrical with the second lens with respect to the diaphragm, and
    a fourth lens element in the form of a positive meniscus lens symmetrical with the first lens with respect to the diaphragm, wherein the lens system fulfills the following conditions:

$0.5(N1+N2) > 1.65$ $0.08f < d4+d5 < 0.15f$ $-0.50f < f1+f2 < -0.25f$

N1: the refractive index on d line of the material of the first and fourth lens elements;
    N2: the refractive index on d line of the material of the second and third lens elements;
    f: the focal length of the entire lens system;
    d4+d5: the axial distance between the second and third lens elements;
    f1: the focal length of the first and fourth lens elements, and
    f2: the focal length of the second and third lens elements.

3. A symmetrical lens system comprising, as arranged from the object side toward the image side:
    a first lens element in the form of a positive meniscus lens having its convex surface directed toward the object side;
    a second lens element in the form of a negative meniscus lens having its convex surface directed toward the object side;
    a diaphragm;
    a third lens element in the form of a negative meniscus lens symmetrical with the second lens with respect to the diaphragm;
    a fourth lens element in the form of a positive meniscus lens symmetrical with the first lens with respect to the diaphragm, and
    at least the concave surface of the first lens element and the fourth lens element being constructed to be aspherical in such a manner that the compactness of the lens system is obtained while maintaining a wide angle and a small F number, wherein the lens system fulfills the following conditions:

$0.5(N1+N2) > 1.65$ $0.08f < d4+d5 < 0.15f$ $-0.50f < f1+f2 < -0.25f$

N1: the refractive index on d line of the material of the first and fourth lens elements;
    N2: the refractive index on d line of the material of the second and third lens elements;
    f: the focal length of the entire lens system;
    d4+d5: the axial distance between the second and third lens elements;
    f1: the focal length of the first and fourth lens elements, and
    f2: the focal length of the second and third lens elements.

4. A symmetrical lens system comprising, as arranged from the object side toward the image side:

a first lens element in the form of a positive meniscus lens having its convex surface directed toward the object side;

a second lens element in the form of a negative meniscus lens having its convex surface directed toward the object side;

a diaphragm;

a third lens element in the form of a negative meniscus lens symmetrical with the second lens with respect to the diaphragm;

a fourth lens element in the form of a positive meniscus lens symmetrical with the first lens with respect to the diaphragm, and at least the concave surface of the first lens element and the fourth lens element being constructed to be aspherical in such a manner that the compactness of the lens system is obtained while maintaining a wide angle and a small F number, wherein the lens system fulfills the following conditions:

$$0.5(N1+N2) > 1.65$$

$$0.08f < d4+d5 < 0.15f$$

$$-0.20f < f1+f2 < -0.10f$$

N1: the refractive index on d line of the material of the first and fourth lens elements;

N2: the refractive index on d line of the material of the second and third lens elements;

f: the focal length of the entire lens system;

d4+d5: the axial distance between the second and third lens elements;

f1: the focal length of the first and fourth lens elements, and f2: the focal length of the second and third lens elements.

5. A symmetrical lens system comprising, as arranged from the object side toward the image side:

a first lens element in the form of a positive meniscus lens having its convex surface directed toward the object side;

a second lens element in the form of a negative meniscus lens having its convex surface directed toward the object side;

a diaphragm;

a third lens element in the form of a negative meniscus lens symmetrical with the second lens with respect to the diaphragm;

a fourth lens element in the form of a positive meniscus lens symmetrical with the first lens with respect to the diaphragm, and both surfaces of all the lens elements being constructed to be aspherical in such a manner that the compactness of the lens system is obtained while maintaining a wide angle and a small F number, wherein the lens system fulfills the following conditions:

$$0.5(N1+N2) > 1.65$$

$$0.06f < d4+d5 < 0.15f$$

$$-0.20f < f1+f2 < -0.10f$$

N1: the refractive index on d line of the material of the first and fourth lens elements;

N2: the refractive index on d line of the material of the second and third lens elements;

f: the focal length of the entire lens system;

d4+d5: the axial distance between the second and third lens elements;

f1: the focal length of the first and fourth lens elements, and f2: the focal length of the second and third lens elements.

* * * * *